United States Patent
Tamura

(10) Patent No.: US 8,619,280 B2
(45) Date of Patent: Dec. 31, 2013

(54) INFORMATION PROCESSING APPARATUS CAPABLE OF COMMUNICATING WITH PRINTING APPARATUS VIA NETWORK AND PRINTING ACCUMULATED PRINT JOBS, INFORMATION PROCESSING SYSTEM INCLUDING INFORMATION PROCESSING APPARATUS, AND INFORMATION PROCESSING METHOD FOR INFORMATION PROCESSING APPARATUS

(75) Inventor: Yuu Tamura, Yokohama (JP)

(73) Assignee: Canon Kabushiki Kaisha (JP)

( * ) Notice: Subject to any disclaimer, the term of this patent is extended or adjusted under 35 U.S.C. 154(b) by 185 days.

(21) Appl. No.: 13/083,052

(22) Filed: Apr. 8, 2011

(65) Prior Publication Data

US 2011/0255129 A1   Oct. 20, 2011

(30) Foreign Application Priority Data

Apr. 15, 2010   (JP) .................................. 2010-094114

(51) Int. Cl.
*G06K 15/00* (2006.01)

(52) U.S. Cl.
USPC ........ 358/1.14; 358/1.13; 358/1.15; 709/223; 705/30; 705/305

(58) Field of Classification Search
USPC ............................. 399/43, 70, 83, 67, 69, 85; 358/1.14–1.15, 1.13, 1.1; 705/30, 305; 709/223

See application file for complete search history.

(56) References Cited

U.S. PATENT DOCUMENTS

| | | | |
|---|---|---|---|
| 6,081,663 A * | 6/2000 | Takahashi et al. | 703/20 |
| 8,432,561 B2 * | 4/2013 | Ebisui | 358/1.14 |
| 2002/0026379 A1 * | 2/2002 | Chiarabini et al. | 705/26 |
| 2004/0125385 A1 * | 7/2004 | Mellor et al. | 358/1.1 |
| 2004/0246512 A1 * | 12/2004 | Miyamoto | 358/1.13 |
| 2006/0250638 A1 * | 11/2006 | Wang et al. | 358/1.15 |
| 2009/0287806 A1 * | 11/2009 | Hamilton et al. | 709/223 |
| 2012/0053868 A1 * | 3/2012 | Matsumoto | 702/61 |
| 2012/0141155 A1 * | 6/2012 | Suzumi | 399/70 |
| 2012/0206752 A1 * | 8/2012 | Yoshizumi | 358/1.13 |

FOREIGN PATENT DOCUMENTS

JP   2004-074530 A   3/2004

OTHER PUBLICATIONS

"Image formation device and its management system" JP 2004-074530 Kobayashi Chiharu—English Translation.*

* cited by examiner

*Primary Examiner* — Twyler Haskins
*Assistant Examiner* — Dennis Dicker
(74) *Attorney, Agent, or Firm* — Rossi, Kimms & McDowell LLP

(57) ABSTRACT

An information processing apparatus capable of reducing power consumption of a printing apparatus efficiently according to a processing situation. An accumulation unit accumulates print jobs that should be transmitted to the printing apparatus. An acquisition unit acquires an operation history and a power consumption history of the printing apparatus. A setting unit sets a threshold value for determining a timing of transmitting the print jobs accumulated in the accumulation unit in series to the printing apparatus based on the operation history and the power consumption history acquired. A determination unit determines the timing of transmitting the print jobs based on the threshold value. A transmission unit transmits the print jobs accumulated in the accumulation unit in series to the printing apparatus at the timing determined.

8 Claims, 11 Drawing Sheets

INFORMATION PROCESSING APPARATUS CAPABLE OF COMMUNICATING WITH PRINTING APPARATUS VIA NETWORK AND PRINTING ACCUMULATED PRINT JOBS, INFORMATION PROCESSING SYSTEM INCLUDING INFORMATION PROCESSING APPARATUS, AND INFORMATION PROCESSING METHOD FOR INFORMATION PROCESSING APPARATUS

BACKGROUND OF THE INVENTION

1. Field of the Invention

The present invention relates to an information processing apparatus capable of communicating with a printing apparatus via a network, an information processing system including this information processing apparatus, and an information processing method in this information processing apparatus.

2. Description of the Related Art

Conventionally, there is a known printing apparatus that operates in a power saving state until receiving a print job from an external apparatus and that shifts from the power saving state to a normal operation state to start printing when receiving a print job from an external apparatus in order to save power consumption.

However, since the shift from the power saving state to the normal operation state needs to execute a process of raising a setting temperature of a heater of a fixing unit to a fixing temperature (for example, 200 degrees centigrade), for example, frequent shifts of the states consume more electric power than keeping the normal operation state.

Therefore, a technique that reduces power consumption of a printing apparatus by reducing the repetition number of the shifts between the normal operation state and the power saving state is proposed (see Japanese Laid-Open Patent Publication (Kokai) No. 2004-74530 (JP 2004-74530A)).

According to this technique, although a printing process does not start immediately even if a print job is received, received print jobs are accumulated. When the total number of the printing pages of the accumulated print jobs exceeds a predetermined number, or when a predetermined waiting time elapses after receiving the print job, the printing process starts.

However, since the technique described in the above-mentioned publication fixes the waiting time, it is difficult to reduce the power consumption efficiently according to the processing situation of the print job by the printing apparatus, etc.

SUMMARY OF THE INVENTION

The present invention provides an information processing apparatus, an information processing system, and an information processing method, which are capable of reducing power consumption of a printing apparatus efficiently according to a processing situation of a print job of the printing apparatus, etc.

Accordingly, a first aspect of the present invention provides an information processing apparatus capable of communicating with a printing apparatus via a network, comprising an accumulation unit configured to accumulate print jobs that should be transmitted to the printing apparatus, an acquisition unit configured to acquire at least one of an operation history and a power consumption history of the printing apparatus from the printing apparatus, a setting unit configured to set a threshold value for determining a timing of transmitting the print jobs accumulated in the accumulation unit in series to the printing apparatus based on at least one of the operation history and the power consumption history acquired by the acquisition unit, a determination unit configured to determine the timing of transmitting the print jobs accumulated in the accumulation unit in series to the printing apparatus based on the threshold value set by the setting unit, and a transmission unit configured to transmit the print jobs accumulated in the accumulation unit in series to the printing apparatus at the timing determined by the determination unit.

Accordingly, a second aspect of the present invention provides an information processing system comprising a printing apparatus configured to execute a printing process based on a received print job, and an information processing apparatus configured to transmit a print job to the printing apparatus. The information processing apparatus comprises an accumulation unit configured to accumulate print jobs that should be transmitted to the printing apparatus, an acquisition unit configured to acquire at least one of an operation history and a power consumption history of the printing apparatus from the printing apparatus, a setting unit configured to set a threshold value for determining a timing of transmitting the print jobs accumulated in the accumulation unit in series to the printing apparatus based on at least one of the operation history and the power consumption history acquired by the acquisition unit, a determination unit configured to determine the timing of transmitting the print jobs accumulated in the accumulation unit in series to the printing apparatus based on the threshold value set by the setting unit, and a transmission unit configured to transmit the print jobs accumulated in the accumulation unit in series to the printing apparatus at the timing determined by the determination unit.

Accordingly, a third aspect of the present invention provides an information processing method for an information processing apparatus capable of communicating with a printing apparatus via a network, comprising an accumulation step of accumulating print jobs that should be transmitted to the printing apparatus, an acquisition step of acquiring at least one of an operation history and a power consumption history of the printing apparatus from the printing apparatus, a setting step of setting a threshold value for determining a timing of transmitting the print jobs accumulated in the accumulation step in series to the printing apparatus based on at least one of the operation history and the power consumption history acquired in the acquisition step, a determination step of determining the timing of transmitting the print jobs accumulated in the accumulation step in series to the printing apparatus based on the threshold value set in the setting step, and a transmission step of transmitting the print jobs accumulated in the accumulation step in series to the printing apparatus at the timing determined in the determination step.

According to the present invention, since the timings of which the print jobs are transmitted in series to the printing apparatus can be appropriately determined based on the operation history or the power consumption history of the printing apparatus, the power consumption of the printing apparatus can be reduced efficiently.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
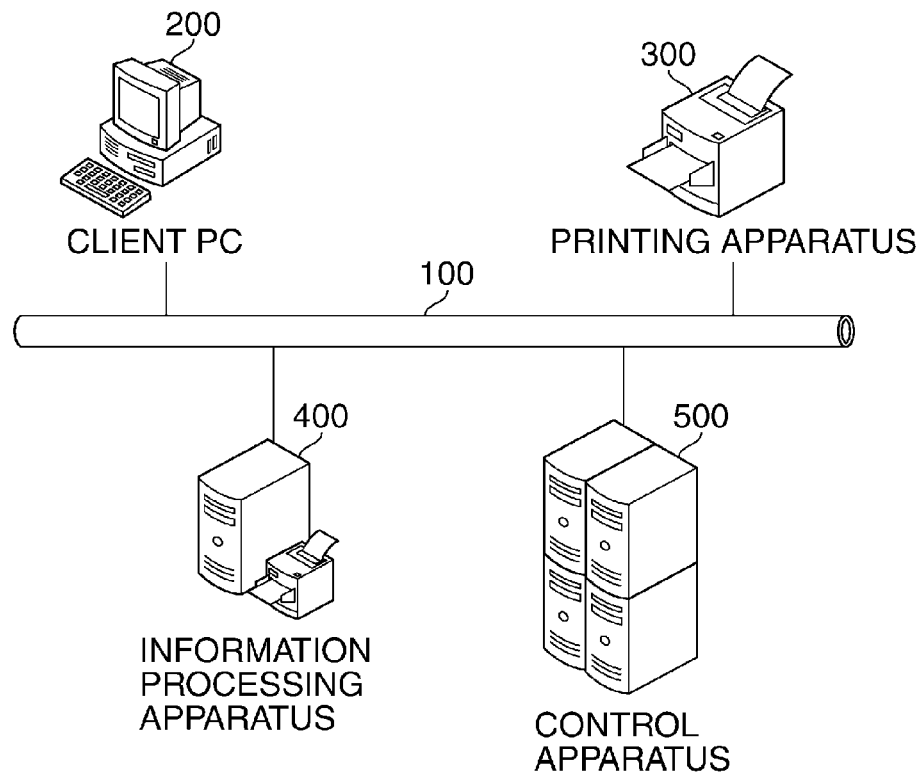
FIG. 1 is a view showing a configuration example of an information processing system according to a first embodiment of the present invention.

FIG. 1 is a view showing a configuration example of an information processing system according to a first embodiment of the present invention.

The information processing system of this embodiment is provided with a client PC 200, a printing apparatus 300, an information processing apparatus 400, and a control apparatus 500 as shown in FIG. 1. These apparatuses are connected via a network 100 so as to enable mutual communications. Here, the information processing apparatus 400 and the control apparatus 500 constitute an example of the information processing apparatus of the present invention in this embodiment.

The client PC 200 issues a print job (referred to as a "job" hereafter), and the printing apparatus 300 processes the job and performs a print operation. The information processing apparatus 400 manages the job issued by the client PC 200, and the control apparatus 500 manages the printing apparatus 300 and the information processing apparatus 400.

In this embodiment, the job issued by the client PC 200 is once accumulated into the information processing apparatus 400 before supplying to the printing apparatus 300. When the number of jobs reaches the maximum number of keeping jobs or when the maximum job-keeping time elapses, the job is supplied to the printing apparatus 300 from the information processing apparatus 400. It should be noted that one or all of the client PC 200, the information processing apparatus 400, and the control apparatus 500 may be constituted on the same computer.

Figure 2:
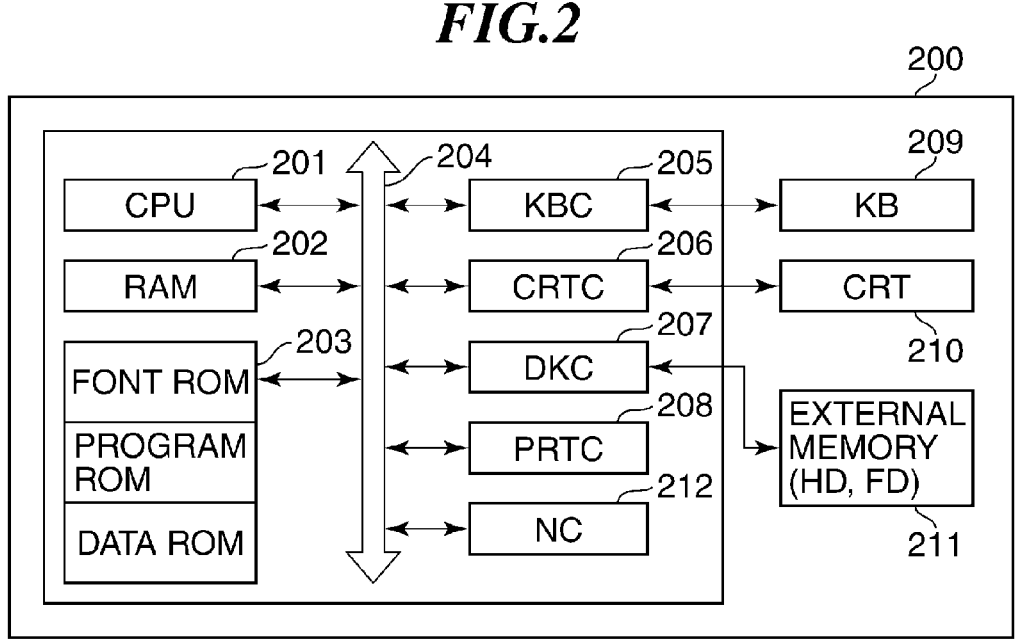
FIG. 2 is a block diagram schematically showing a configuration example of a client PC shown in FIG. 1.

FIG. 2 is a block diagram schematically showing one configuration example of the client PC 200. In this embodiment, the information processing apparatus 400 and the control apparatus 500 are also provided with the same configuration as the client PC 200.

In FIG. 2, a CPU 201 executes programs loaded into a RAM 202 from a program ROM of a ROM 203 or an external memory (a HDD etc.) 211 to control each block that is connected to a system bus 204. The RAM 202 functions as a main memory of the CPU 201, a work area, etc. A KBC (a keyboard controller) 205 controls key inputs from a KB (a keyboard) 209 and a pointing device (not shown).

A CRTC (a CRT controller) 206 controls display of a CRT 210. A DKC (a disk controller) 207 controls data access in the external memory 211 (the HDD etc.). A PRTC (a printer controller) 208 controls exchange of data etc. with the printing apparatus 300 connected via the network 100. A NC (a network controller) 212 controls communications with the printing apparatus 300 and other apparatuses connected via the network 100.

Figure 3:
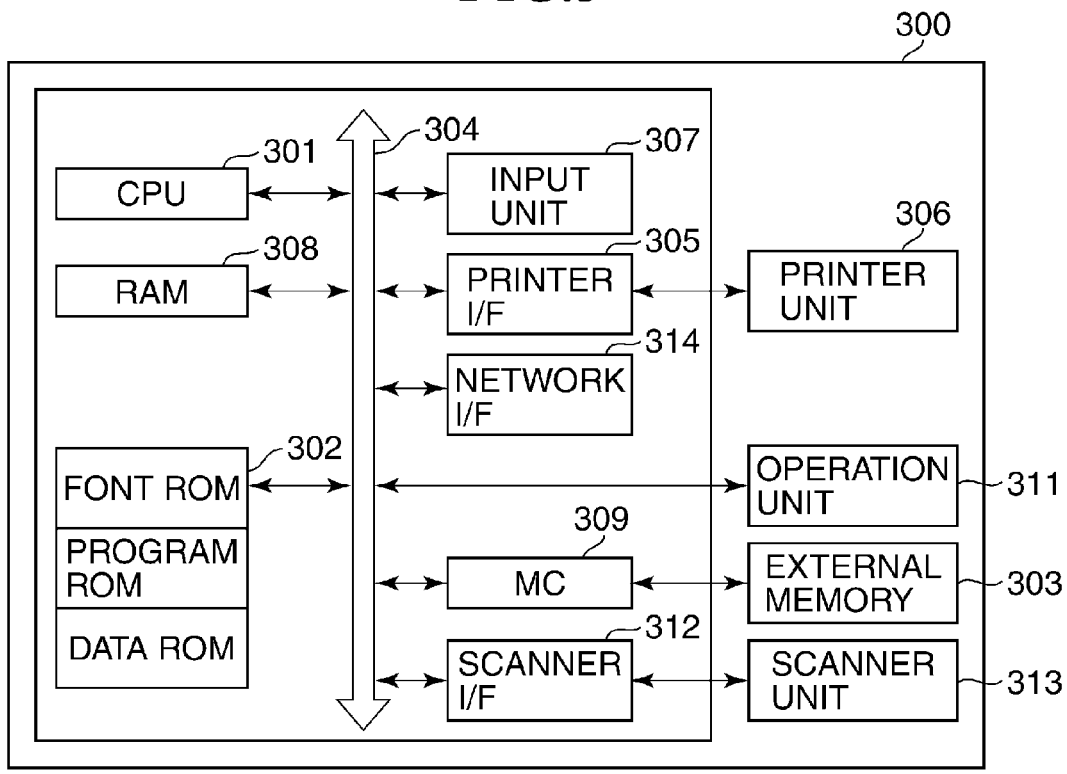
FIG. 3 is a block diagram schematically showing a configuration example of a printing apparatus shown in FIG. 1.

FIG. 3 is a block diagram schematically showing a configuration example of the printing apparatus 300 shown in FIG. 1.

In FIG. 2, a CPU 301 executes programs loaded into a RAM 308 from a program ROM of a ROM 302 or an external memory (a HDD etc.) 303 to control each block that is connected to a system bus 304. An image signal generated by the process of the CPU 301 is outputted to a printer unit (an engine) 306 via a printer I/F 305. The CPU 301 is able to communicate with the client PC 200 via an input unit 307.

The RAM 308 functions as a main memory of the CPU 301, a work area, etc., and is used as an outputting information development area, an environment data storage area, etc. A MC (a memory controller) 309 controls an access to the external memory 303. The external memory 303 is connected as an option and stores font data, an emulation program, form data, etc. An operation unit 311 consists of a switch that a user operates, a LED display unit, etc.

A scanner I/F 312 corrects, processes, and edits image data from a scanner unit 313. When a user instructs to start reading an image by an operation on the operation unit 311, the scanner unit 313 converts image information on an original into an electric signal by receiving a reflected light obtained by scanning the image of the original by a CCD sensor etc. The scanner unit 313 converts the converted electric signal into luminance signals of colors R, G, and B, and reads the luminance signals as image data.

A network I/F 314 is an interface for receiving the job transmitted from the information processing apparatus 400. The network I/F 314 stores the job received from the information processing apparatus 400 into the RAM 308.

Figure 4:
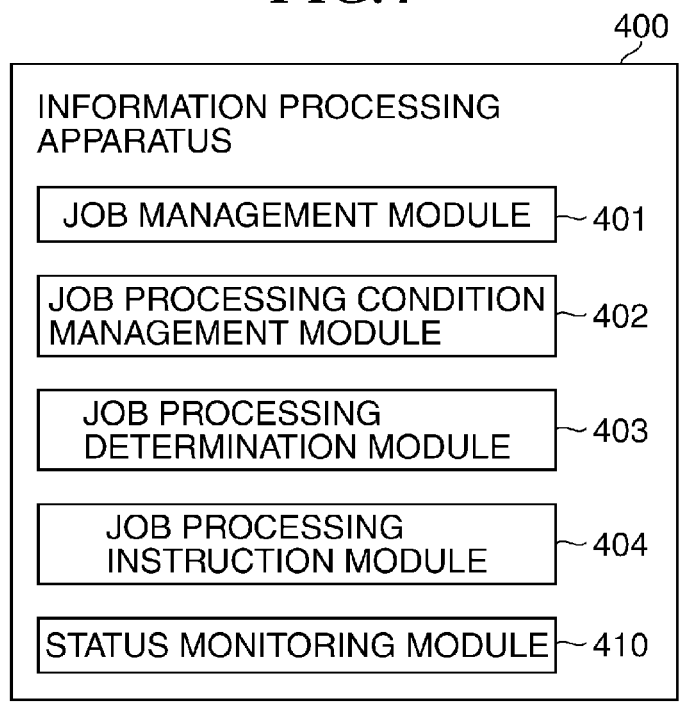
FIG. 4 is a block diagram schematically showing a module configuration example of software included in an information processing apparatus shown in FIG. 1.

FIG. 4 is a block diagram schematically showing a module configuration of software included in the information processing apparatus 400.

As shown in FIG. 4, the information processing apparatus 400 is provided with a job management module 401, a job processing condition management module 402, a job processing determination module 403, a job processing instruction module 404, and a mode monitoring module 410.

The job management module 401 accumulates the jobs that are issued by the client PC 200, and keeps them as a queue (a job reservation list). The job processing determination module 403 determines whether the jobs kept by the job management module 401 may be processed based on a threshold value (mentioned below) that is managed by the job processing condition management module 402. When the job processing determination module 403 determines that the jobs may be processed, the job processing instruction module 404 instructs the printing apparatus 300 to start the processing of the jobs kept by the job management module 401. The mode monitoring module 410 monitors whether the printing apparatus 300 is in a normal operation mode.

Figure 5:
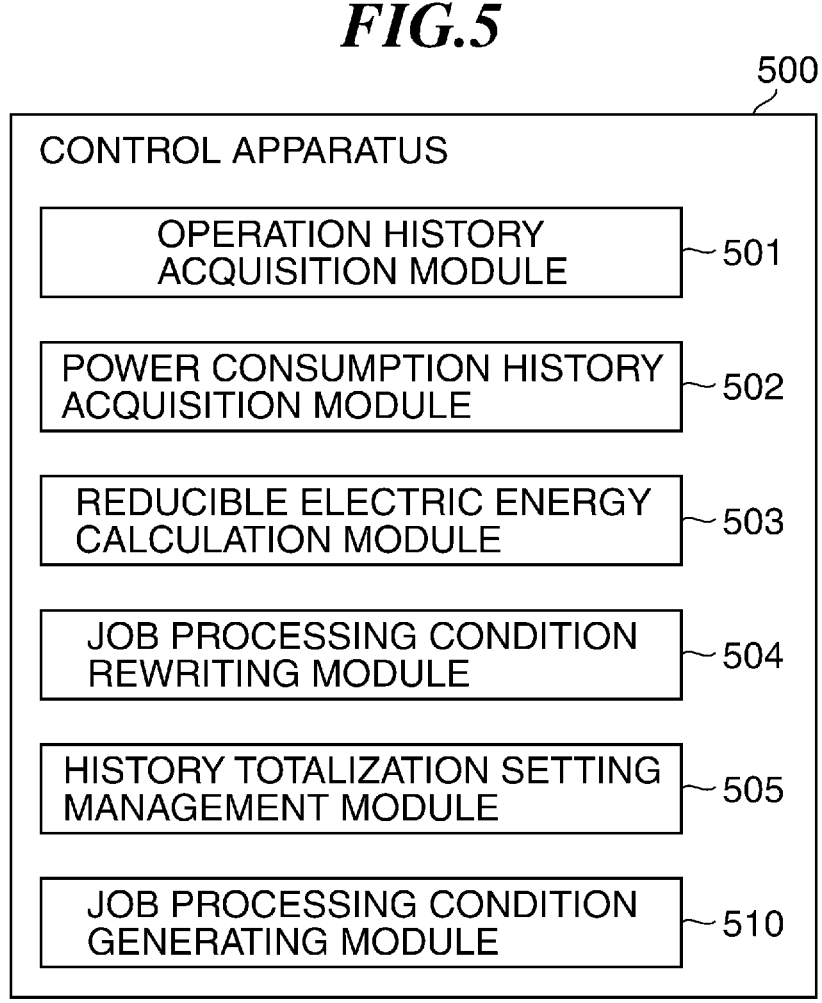
FIG. 5 is a block diagram schematically showing a module configuration example of software included in a control apparatus shown in FIG. 1.

FIG. 5 is a block diagram schematically showing a module configuration of software included in the control apparatus 500.

As shown in FIG. 5, the control apparatus 500 is provided with an operation history acquisition module 501, a power consumption history acquisition module 502, and a reducible electric energy calculation module 503. The control apparatus 500 is also provided with a job processing condition rewriting module 504, a history totalization setting management module 505, and a job processing condition generating module 510.

The operation history acquisition module 501 and the power consumption history acquisition module 502 acquire an operation history and a power consumption history of the printing apparatus 300 via the network 100. The reducible electric energy calculation module 503 calculates reducible electric energy based on the operation history and the power consumption history acquired. The job processing condition generating module 510 generates a new threshold value based on the calculated electric energy for determining whether the job processing determination module 403 may process the jobs. The job processing condition rewriting module 504 notifies the new threshold value generated by the job processing condition generating module 510 to the information processing apparatus 400 via the network 100. The information processing apparatus 400 manages the notified threshold value by the job processing condition management module 402. In this embodiment, the job processing condition generating module 510 generates a threshold value for the maximum number of keeping jobs and threshold values for the maximum job-keeping time mentioned later. The threshold values for the maximum job-keeping time include first, second, and third threshold values.

Figure 6:
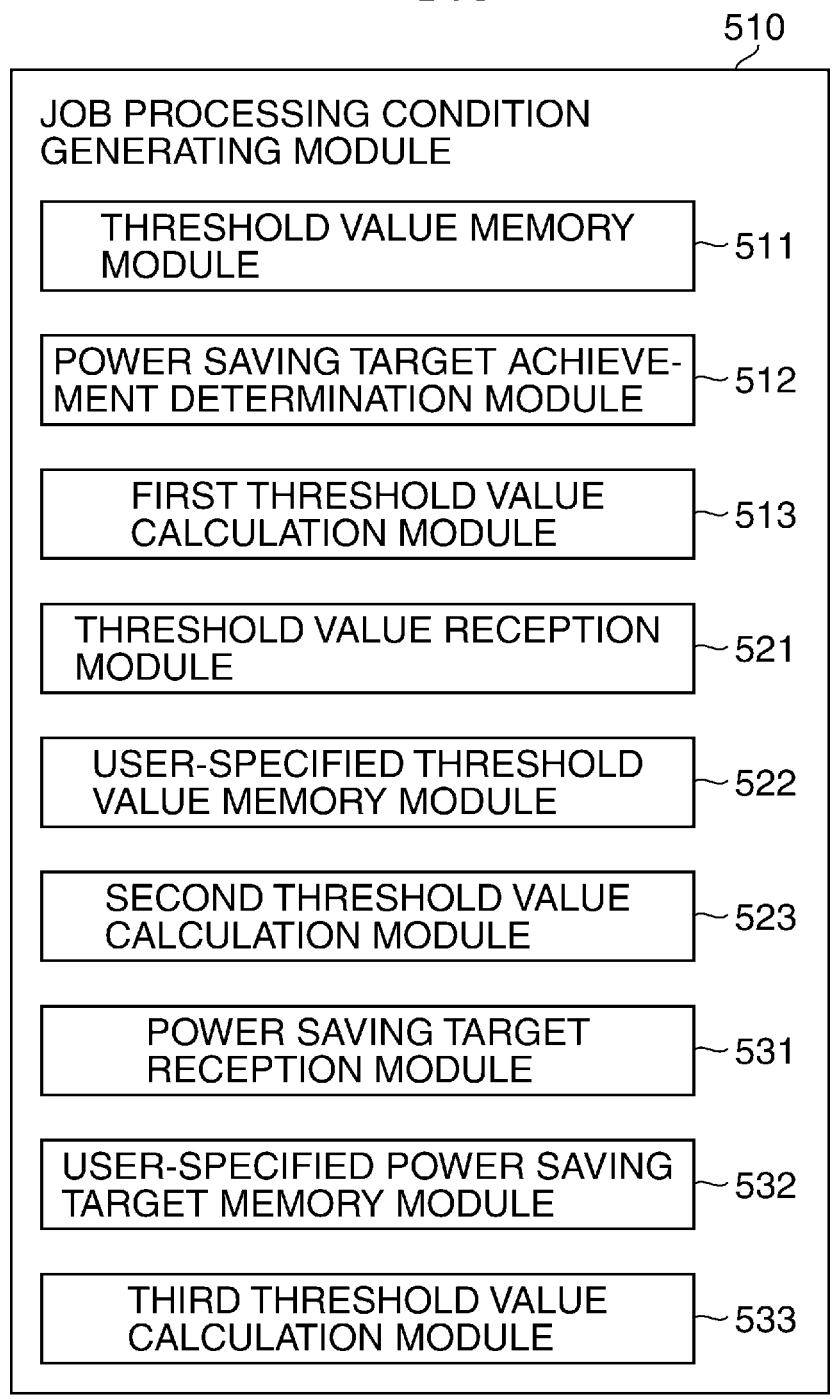
FIG. 6 is a block diagram schematically showing a detailed configuration example of a job processing condition generating module shown in FIG. 5.

FIG. 6 is a block diagram schematically showing a configuration example of the job processing condition generating module 510 for calculating the first, second, and third threshold values for the maximum job-keeping time.

In FIG. 6, a first threshold value calculation module 513 calculates a set value as the first threshold value using a threshold value memory module 511 and a power saving target achievement determination module 512. A second threshold value calculation module 523 calculates a set value as the second threshold value using a threshold value reception module 521 and a user-specified threshold value memory module 522. The third threshold value calculation module 533 calculates a set value as the third threshold value using a power saving target reception module 531 and a user-specified power saving target memory module 532.

Figure 7:
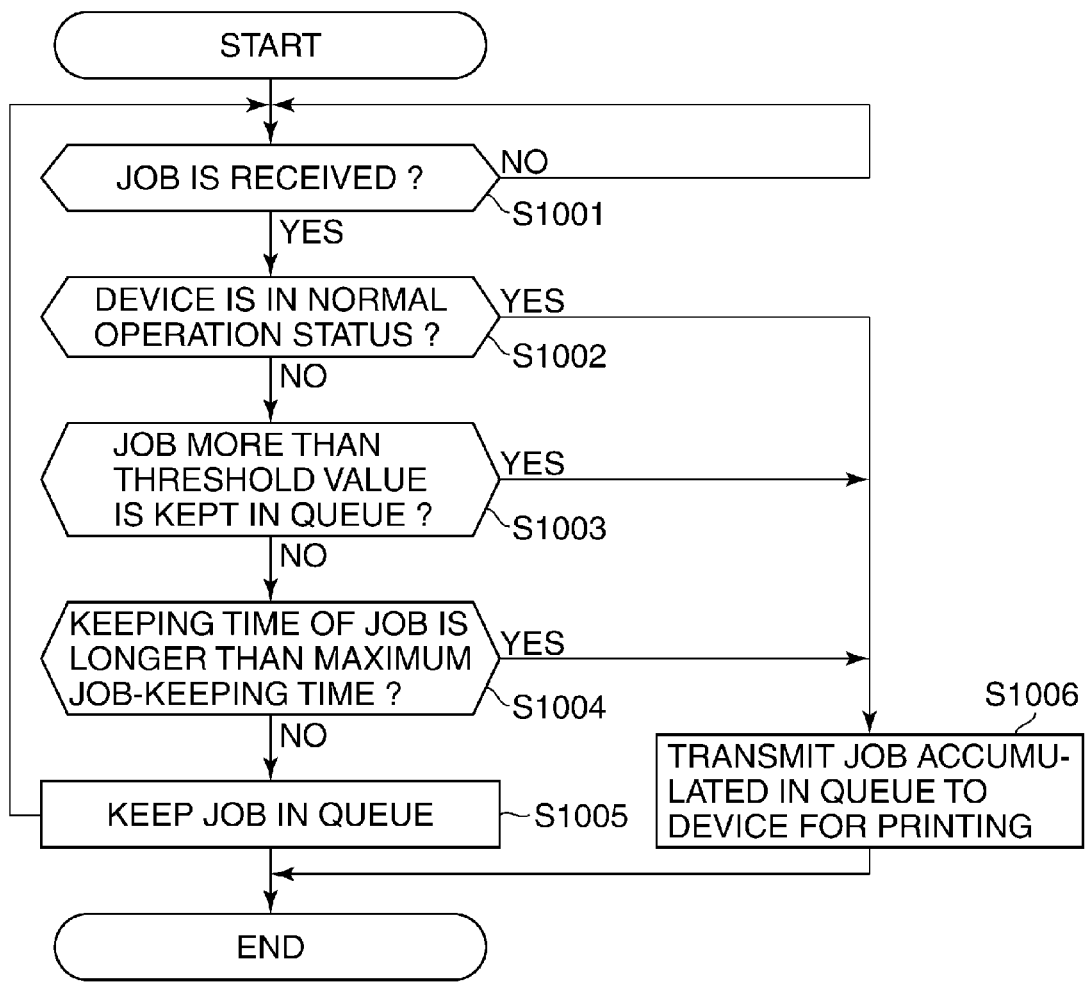
FIG. 7 is a flowchart showing a job management process in the information processing apparatus shown in FIG. 1.

FIG. 7 is a flowchart showing a job management process in the information processing apparatus 400. Each process in FIG. 7 is achieved by loading a program stored in the ROM 203 etc. of the information processing apparatus 400 onto the RAM 202 and by executing the program by the CPU 201 etc. It should be noted that the CPU 201 of the information processing apparatus 400 will be described as a CPU 201A for convenience of description.

In FIG. 7, when the client PC 200 receives a job in step S1001, the CPU 201A proceeds with the process to step S1002.

In the step S1002, the CPU 201A controls the mode monitoring module 410 to determines whether the printing apparatus 300 that processes the job received in the step S1001 is in the normal operation mode. When determining that the printing apparatus 300 is not in the normal operation mode (a sleeping mode etc.), the CPU 201A proceeds with the process to step S1003. When determining that it is in the normal operation mode, the CPU 201A proceeds with the process to step S1006. Here, the normal operation mode means that electric power is supplied to each parts of the printing apparatus 300 including the printer unit 306. The mode other than the normal operation mode means a power saving mode (a sleeping mode) in which power consumption is lower than the normal operation mode. In the power saving mode, the electric power supplied to parts of the printing apparatus 300, such as the printer unit 306, is intercepted. It should be noted that the electric power is supplied to at least the network I/F 314, the CPU 301, and the RAM 308 so that the printing apparatus 300 can receive the jobs transmitted from the information processing apparatus 400 even in the power saving mode.

In the step S1003, the CPU 201A acquires the number of jobs kept in a queue from the job management module 401 by the job processing determination module 403. The CPU 201A acquires the threshold value for the number of jobs kept in a queue (the maximum number of keeping jobs) from the job processing condition management module 402 by the job processing determination module 403, and compares the number of jobs and the threshold value acquired. Then, the CPU 201A proceeds with the process to the step S1006, when the number of jobs in the queue is not less than the maximum number of keeping jobs. Otherwise, when the number of jobs in the queue is less than the maximum number of keeping jobs, the CPU 201A proceeds with the process to step S1004.

In the step S1004, the CPU 201A acquires a keeping time of a job in the queue from the job management module 401 by the job processing determination module 403. The CPU 201A acquires the threshold value for the maximum job-keeping time during which a job is kept in a queue from the job processing condition management module 402 by the job processing determination module 403. Then, the CPU 201A compares the keeping time with the threshold value for the maximum job-keeping time acquired, by the job processing determination module 403. Then, the CPU 201A proceeds with the process to the step S1006, when the keeping time of the job is not less than the maximum job-keeping time. Otherwise, when the keeping time of the job is less than the maximum job-keeping time, the CPU 201A proceeds with the process to step S1005.

In the step S1005, the CPU 201A keeps the jobs in the queue in the job management module 401 by the job processing instruction module 404, and returns the process to the step S1001.

In the step S1006, the CPU 201A transmits the jobs kept in the queue in the job management module 401 to the printing apparatus 300 by the job processing instruction module 404, instructs to process the jobs, and finishes the process.

Figure 8:
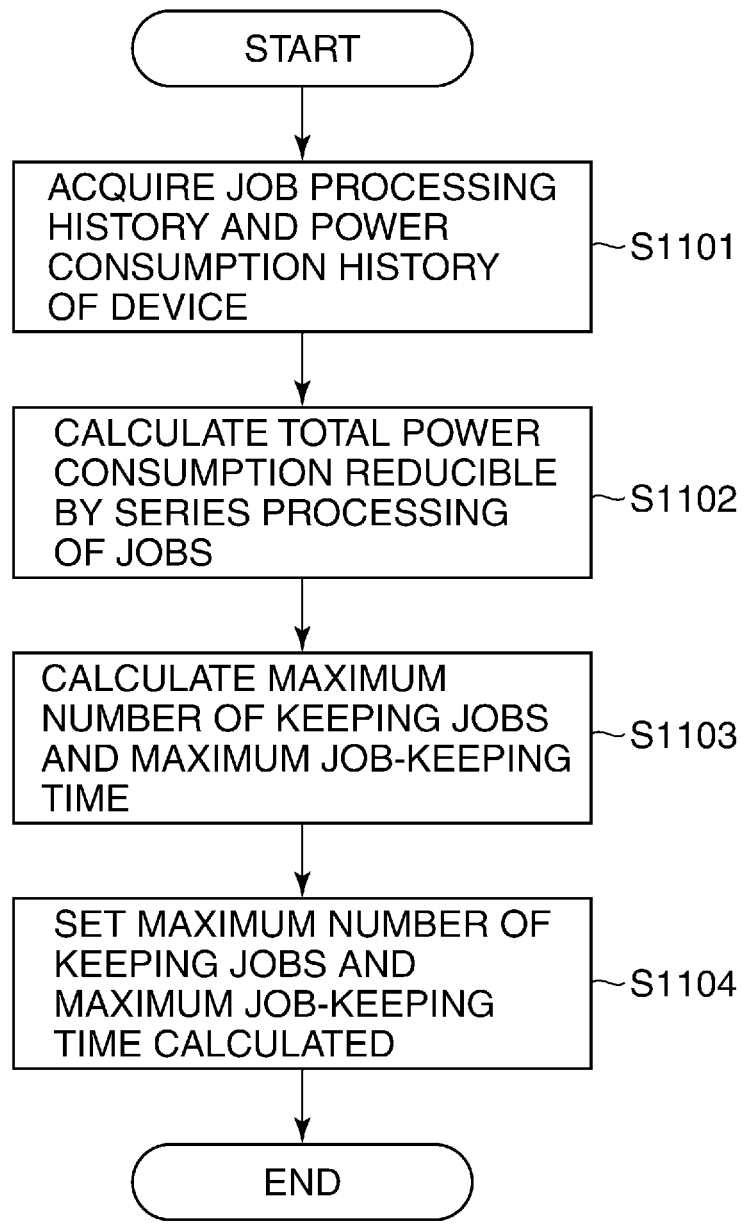
FIG. 8 is a flowchart showing a job processing condition rewriting process in the control apparatus shown in FIG. 1.

FIG. 8 is a flowchart showing a job processing condition rewriting process in the control apparatus 500. The process in FIG. 8 is executed in order to rewrite the job processing condition set in the information processing apparatus 400. Each process in FIG. 8 is achieved by loading a program stored in the ROM 203 etc. of the control apparatus 500 onto the RAM 202 and by executing the program by the CPU 201 etc. It should be noted that the CPU 201 of the control apparatus 500 will be described as a CPU 201B for convenience of description.

In step S1101, the CPU 201B acquires an operation history and a power consumption history from the printing apparatus 300 via the network 100 by the operation history acquisition module 501 and the power consumption history acquisition module 502, and proceeds with the process to step S1102. It should be noted that the history acquisition process will be described with reference to FIG. 9 later.

In the step S1102, the CPU 201B calculates the total power consumption reduced by series processing of the jobs with the printing apparatus 300, by the reducible electric energy calculation module 503, and proceeds with the process to step S1103. The calculation process of the power consumption will be described with reference to FIG. 10 later.

In the step S1103, the CPU 201B calculates threshold values using the histories acquired in the step S1101 and the total power consumption calculated in the step S1102 by the job processing condition generating module 510, and proceeds with the process to step S1104. It should be noted that the calculation processes of the threshold values for the maximum number of keeping jobs and the maximum job-keeping time will be described with reference to FIG. 12 and FIG. 13 later, respectively.

In the step S1104, the CPU 201B sets the threshold values for the maximum number of keeping jobs and the maximum job-keeping time calculated in the step S1103 to the information processing apparatus 400 by the job processing condition rewriting module 504, and finishes the process.

Figure 9:
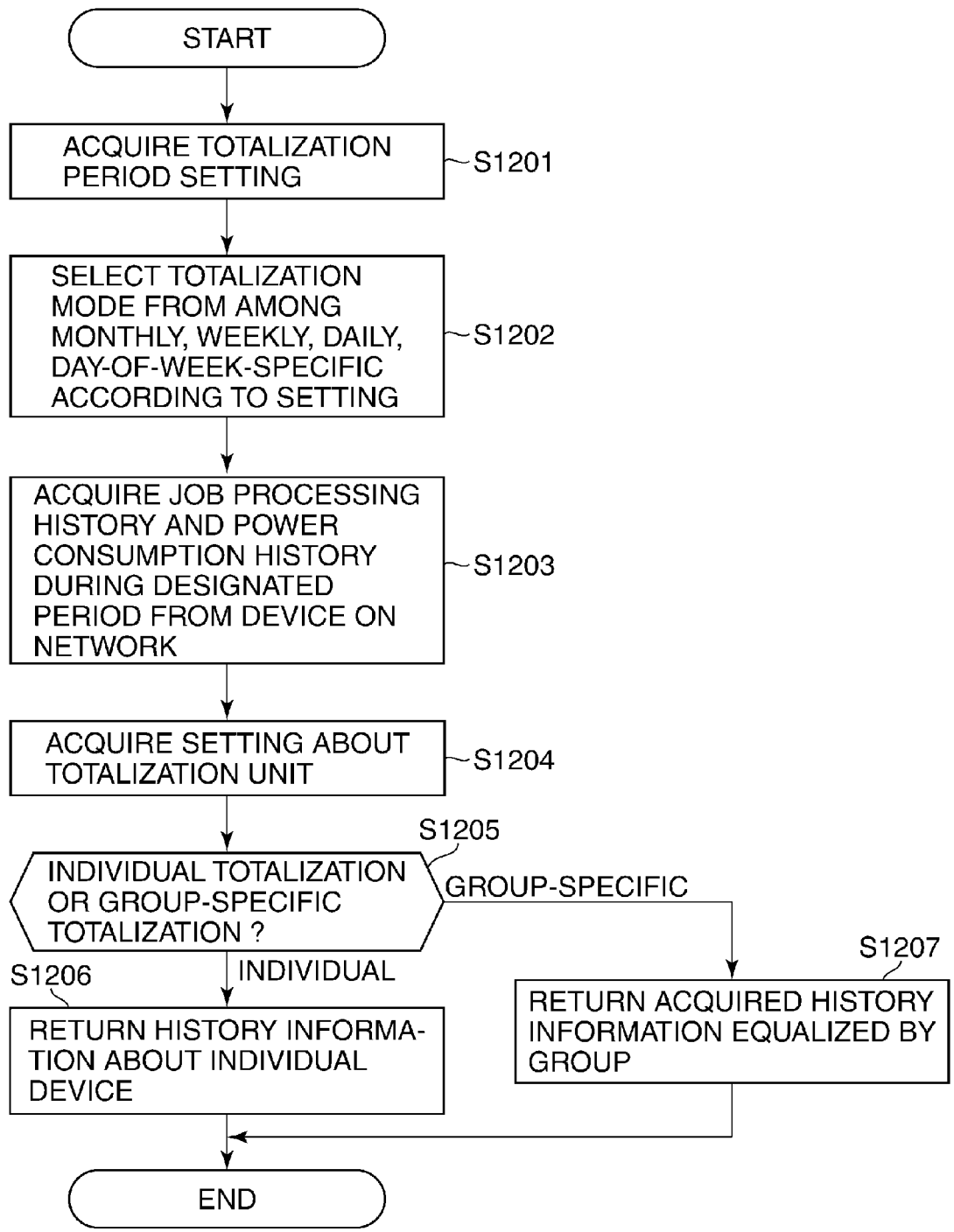
FIG. 9 is a flowchart showing a detailed example of a process for acquiring a power consumption history and an operation history executed in the step S1101 in FIG. 8.

FIG. 9 is a flowchart showing a detailed example of a process for acquiring the power consumption history and the operation history executed in the step S1101 in FIG. 8.

In FIG. 9, in step S1201, the CPU 201B acquires setting information of a history totalization period stored beforehand by the history totalization setting management module 505, and proceeds with the process to step S1202.

In the step S1202, the CPU 201B selects a totalization mode by the history totalization setting management module 505 from among a monthly totalization mode, a weekly totalization mode, a daily totalization mode, and a day-of-week-specific totalization mode, according to the setting of the history totalization period acquired in the step S1201, and proceeds with the process to step S1203.

In the step S1203, the CPU 201B acquires the operation history and the power consumption history from the printing apparatus 300 according to the totalization mode set, by the operation history acquisition module 501 and the power consumption history acquisition module 502, and proceeds with the process to step S1204. For example, the history of the last month is acquired in order to determine a threshold value of this month in the monthly totalization mode. In the day-of-week-specific totalization mode, the history corresponding to the day of week is acquired in order to determine the threshold value of the specific day of week. In the day-of-week-specific totalization mode, when the total time during which the printing apparatus 300 executed the printing process according to the print jobs is 2 hours on Monday, for example, the information showing 2 hours becomes the operation history. If the electric energy consumed when the printing apparatus 300 executed the printing process according to the print jobs on Monday is 2,000 Wh, for example, the information showing 2,000 Wh becomes the power consumption history.

In the step S1204, the CPU 201B acquires the setting information about a totalization unit (an individual totalization or a group-specific totalization) stored beforehand by the history totalization setting management module 505, and proceeds with the process to step S1205.

In step S1205, the CPU 201B determines whether the histories acquired in the step S1203 are totalized as the individual totalization or the group-specified totalization based on the setting acquired in the step S1204 by the history totalization setting management module 505. Then, the CPU 201B proceeds with the process to step S1206 when the histories acquired in the step S1203 are totalized individually. When the histories are totalized by group, the CPU 201B proceeds with the process to step S1207.

In step S1206, by the operation history acquisition module 501 and the power consumption history acquisition module 502, the CPU 201B returns the history acquired from the printing apparatus 300 to the printing apparatus 300 as an individual history for every printing apparatus 300, and finishes a process.

In the step S1207, the CPU 201B equalizes the histories acquired in the step S1203 for each group according to the setting information acquired in the step S1204 by the operation history acquisition module 501 and the power consumption history acquisition module 502. Then, the CPU 201B returns the histories equalized for each group to the printing apparatus 300 by the operation history acquisition module 501 and the power consumption history acquisition module 502, and finishes the process.

Figure 10:
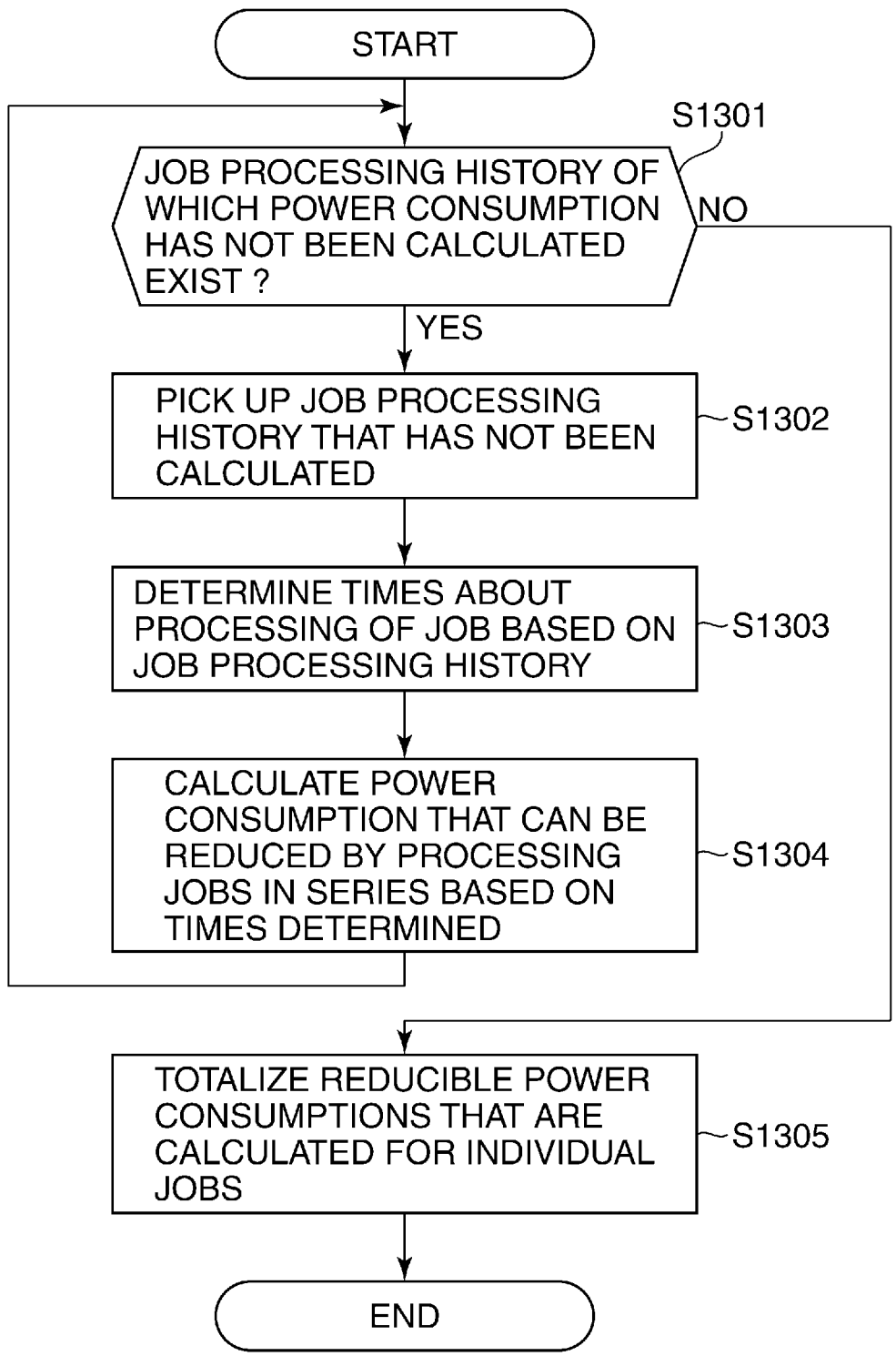
FIG. 10 is a flowchart showing a detailed example of a process for calculating reducible power consumption executed in the step S1102 in FIG. 8.

FIG. 10 is a flowchart showing a detailed example of a process for calculating reducible power consumption executed in the step S1102 in FIG. 8.

In FIG. 10, in step S1301, the CPU 201B determines whether there is any operation history of a job of which reducible electric energy has not been calculated among the operation histories acquired in the step S1101 by the reducible electric energy calculation module 503. When there is an operation history of an unfinished job, the CPU 201B proceeds with the process to step S1302. When there is no operation history of an unfinished job, the CPU 201B proceeds with the process to step S1305.

In the step S1302, the CPU 201B picks up one operation history of an unfinished job from among the operation histories acquired in the step S1101 by the reducible electric energy calculation module 503, and proceeds with the process to step S1303.

In the step S1303, the CPU 201B determines the following times about each job based on the operation history picked up in the step S1302 by the reducible electric energy calculation module 503, and proceeds with the process to step S1304. The determined times include the time when a certain job was supplied to the printing apparatus 300, the time when the printing apparatus 300 started a preparation of the process for the job, the time when the process for the job was started, and the time when the process of the job was completed. The time when the printing apparatus 300 shifted to the power saving mode after the job completion, or the time when a preparation of the process for a next job was started is also determined.

In the step S1304, the CPU 201B calculates power consumption that can be reduced when the job concerned is processed in series with the previous job and the next job based on the times determined in the step S1303 by the reducible electric energy calculation module 503, and returns the process to the step S1301.

In the step S1305, the CPU 201B totalizes the reducible power consumptions that are calculated for the individual jobs by the process in the steps S1302 to S1304 by the reducible electric energy calculation module 503.

Here, the process in the steps S1304 and S1305 will be described in detail with reference to FIG. 11.

Figure 11:
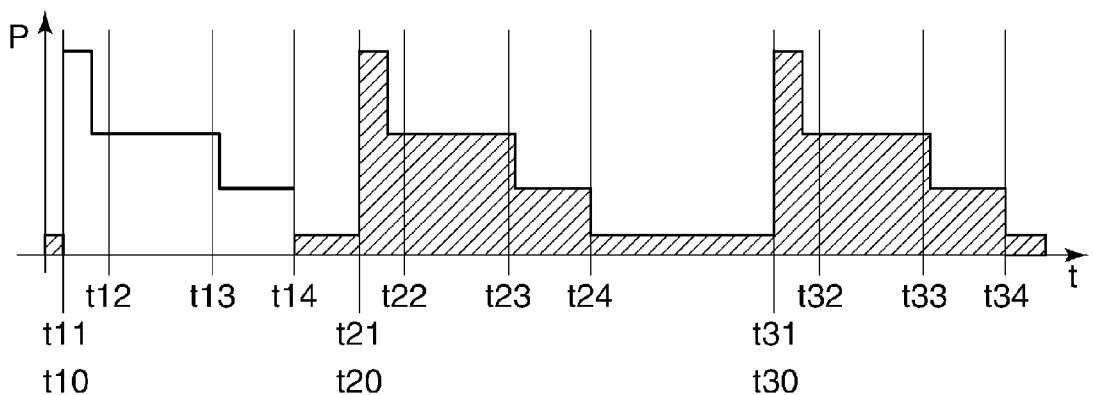
FIG. 11 is a graph showing an example of the power consumption history acquired in the step S1101 in FIG. 8.

FIG. 11 is a graph showing an example of the power consumption history acquired in the step S1101 in FIG. 8. Here, the power consumption P at a time t is taken as P=f(t). The time when the m-th (1≤m≤M) job in the operation history of the printing apparatus 300 acquired in the step S1101 was supplied to the printing apparatus 300 is $t_{m0}$, and the time when the printing apparatus 300 started a preparation of the process for the job is $t_{m1}$. The time when the process of the job was started is $t_{m2}$, and the time when the process of the job was completed is $t_{m3}$. The time when the printing apparatus 300 shifted to the power saving mode (the sleeping mode) after the job completion, or the time when the processing preparation for a next job was started is $t_{m4}$.

Here, when focusing the case of m=1, the job supplied time is $t_{10}$, the job processing preparation start time is $t_{11}$, the job processing start time is $t_{12}$, the job processing completion time is $t_{13}$, and the power saving mode shifting time is $t_{14}$.

Next, the reducible power consumption W is calculated. The value of W is equal to the sum total of the power consumption during a period from the time when the printing apparatus 300 starts the processing preparation for the job to the time of starting the job processing and the power consumption during a period from time of completing the job processing to the time of shifting to the power saving mode or of starting the processing preparation for the next job. Therefore, the reducible power consumption W can be calculated with the following formula (1).

$$W = \sum_{m=1}^{M} \left( \int_{t_{m1}}^{t_{m2}} f(t)dt + \int_{t_{m3}}^{t_{m4}} f(t)dt \right) \quad (1)$$

$$= \sum_{m=1}^{M} \{(F(t_{m2}) - F(t_{m1})) + (F(t_{m4}) - F(t_{m3}))\}$$

Here, F(t) is the power consumption at the time t. Therefore, in the step S1305, the reducible electric energy calculation module 503 acquires the power consumptions Wt=F(t) at the times $t_{m1}$, $t_{m2}$, $t_{m3}$, and $t_{m4}$ for each job, and calculates the reducible power consumption W by summing the power consumptions of all the jobs.

Figure 12:
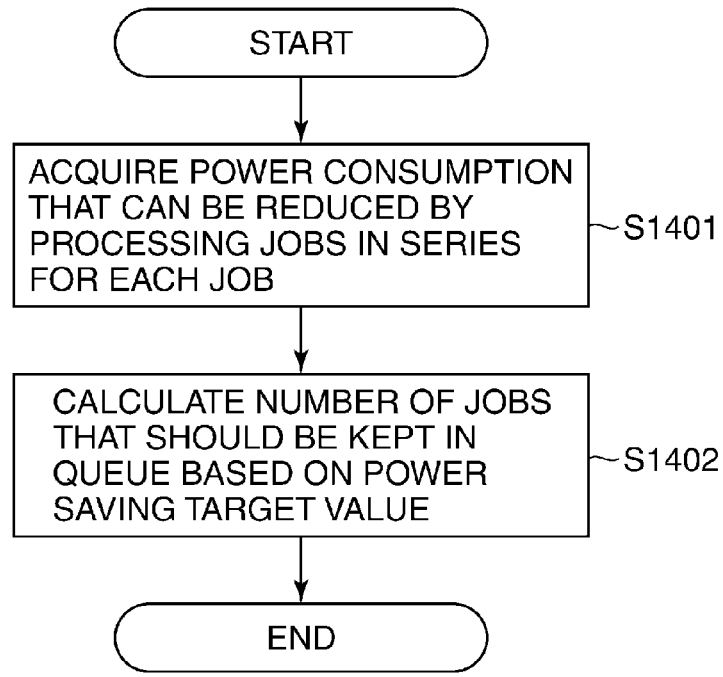
FIG. 12 is a flowchart showing a process for calculating the maximum number of keeping jobs executed in the step S1103 in FIG. 8.

FIG. 12 is a flowchart showing a process for calculating the maximum number of keeping jobs executed in the step S1103 in FIG. 8.

In the step S1401, the CPU 201B acquires the power consumption that can be reduced when the job concerned is processed in series with the previous job and the next job, which was calculated in the step S1304 in FIG. 10, by the job processing condition generating module 510, and proceeds with the process to the step S1402.

In the step S1402, the CPU 201B calculates the maximum number of keeping jobs that should be kept in a queue by dividing the power saving target value by the power consumption acquired in the step S1401 by the job processing condition generating module 510, and finishes the process. Here, the power saving target value may be designated by a user's operation or may be the value stored in the job processing condition generating module 510.

Figure 13:
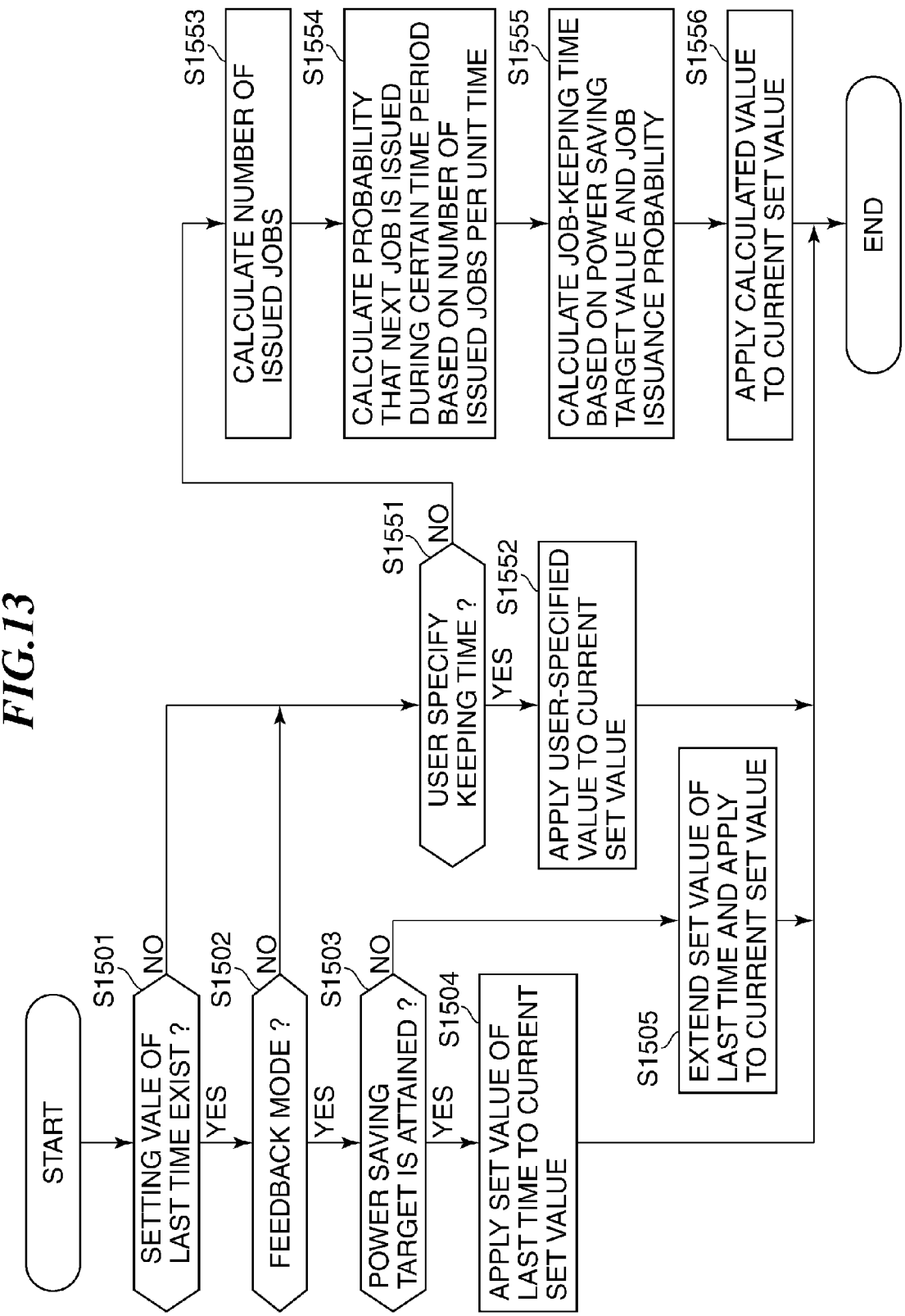
FIG. 13 is a flowchart showing a process for calculating the maximum job-keeping time executed in the step S1103 in FIG. 8.

FIG. 13 is a flowchart showing a process for calculating the maximum job-keeping time executed in the step S1103 in FIG. 8.

In step S1501, the CPU 201B controls the first threshold value calculation module 513 to query the threshold value memory module 511 to confirm whether the information processing apparatus 400 stores the maximum job-keeping time set at the last time. Then, the CPU 201B proceeds with the process to step S1502, when the threshold value memory module 511 stores the set value of the last time. If not, the CPU 201B proceeds with the process to step S1551.

In the step S1502, the CPU 201B checks whether the current mode is a maximum-job-keeping-time determination mode stored beforehand or a feedback mode by the first threshold value calculation module 513. Then, the CPU 201B proceeds with the process to the step S1551 in the feedback mode. When the current mode is not the feedback mode, the CPU 201B proceeds with the process to step S1503.

In the step S1503, the CPU 201B queries a power saving target achievement determination module, and compares the power saving target value with the power consumption calculated in the step S1102 by the first threshold value calculation module 513. Then, the CPU 201B proceeds with the process to step S1505, when the power consumption has attained the power saving target value. When it has not attained, the CPU 201B proceeds with the process to step S1504.

In the step S1504, the CPU 201B applies the set value of the last time stored in the threshold value memory module 511 to the current set value by the first threshold value calculation module 513, sets this set value to the information processing apparatus 400, and finishes the process.

In step S1505, the CPU 201B extends the maximum job-keeping time as the set value of the last time that has been stored in the threshold value memory module 511 by the first threshold value calculation module 513, and calculates a new maximum job-keeping time. Then, the CPU 201B sets the newly-calculated maximum job-keeping time to the information processing apparatus 400 as the current set value, updates the maximum job-keeping time stored in the threshold value memory module 511, and finishes the process.

In the step S1551, the CPU 201B controls the second threshold value calculation module 523 to query the user-specified threshold value memory module 522 so as to check whether there is any user-specified keeping time. Then, the CPU 201B proceeds with the process to step S1552, when the user-specified threshold value memory module 522 has stored the user-specified threshold value via the threshold value reception module 521. If not, the CPU 201B proceeds with the process to step S1553.

In the step S1552, the CPU 201B sets the maximum job-keeping time stored in the user-specified threshold value memory module 522 to the information processing apparatus 400 by the second threshold value calculation module 523 as the current set value. The CPU 201B also updates the maximum job-keeping time stored in the threshold value memory module 511 to the current set value by the second threshold value calculation module 523, and finishes the process.

In the step S1553, the CPU 201B calculates the number of issued jobs per unit time by the third threshold value calculation module 533 based on the operation histories acquired in the step S1101, and proceeds with the process to step S1554. According to the settings acquired in the steps S1202 and S1204, the value equalized in a group of a specific period or a specific printing apparatus is used for the number of issued jobs per unit time here. For example, the histories of the last month are used in order to determine a threshold value of this month in the monthly totalization mode. In the day-of-week-specific totalization mode, the histories corresponding to the day of week are used in order to determine a threshold value of the specific day of week.

In the step S1554, the CPU 201B calculates a probability that a next job is issued within a certain time by the third threshold value calculation module 533 based on the number of issued jobs per unit time calculated in the step S1553, and proceeds with the process to the step S1555.

In the step S1555, the CPU 201B acquires a power saving target value from the user-specified power saving target memory module 532 by the third threshold value calculation module 533. Then, the CPU 201B calculates a new maximum job-keeping time by the third threshold value calculation module 533 based on the acquired power saving target value and the job issue probability calculated in the step S1554, and proceeds with the process to the step S1556.

In the step S1556, the CPU 201B sets the new maximum job-keeping time calculated in the step S1555 to the information processing apparatus 400 by the third threshold value calculation module 533 as the current set value. The CPU 201B also updates the maximum job-keeping time stored in the threshold value memory module 511 to the current set value by the third threshold value calculation module 533, and finishes the process.

Next, the process of the steps S1553 through S1555 will be described in detail.

Assuming that the issuance of a job follows the Poisson process, and when the average number of issuance of jobs per unit time calculated in the step S1553 is λ, the probability P ($N_t$=k) that jobs will be issued k times within a time period t is expressed by the following formula (2).

$$P(N_t = k) = \frac{e^{-\lambda t}(\lambda t)^k}{k!} \qquad (2)$$

Therefore, in the step S1554, the probability Pt that a job will be issued within the time period t can be calculated using the probability P ($N_t$=0) that no job will be issued within the time period by the following formula (3).

$$1 - P(N_t = 0) = 1 - \frac{e^{-\lambda t}(\lambda t)^0}{0!} = 1 - e^{-\lambda t} = Pt \qquad (3)$$

Therefore, when a process for a certain job waits by the time period t, the certain job can be processed together with a next job in the probability Pt, which can reduce the power consumption.

Here, the power consumption reduced when the job concerned is collectively processed with the previous job and the next job is represented by $W_{cut-each}$ (Wh), and the number of jobs issued a day is represented by M. In this case, the reducible power consumption $W_{cut-total}$ by a day by waiting the processing of a job by the time period t is approximated by the following formula (4).

$$W_{cut-total} = (1 - e^{-\lambda t}) \cdot W_{cut-each} \cdot M \qquad (4)$$

Here, the maximum value $W_{cut-MAX}$ of the reducible power consumption by a day is expressed by the following formula (5) for simplifying.

$$W_{cut-MAX} = W_{cut-each} \cdot M \qquad (5)$$

A ratio of the power consumption reduction target value by a day to the maximum value $W_{cut-MAX}$ of the reducible power consumption by a day is represented by α (0≤α≤1). It should be noted that the ratio α has been received by the power saving target reception module 531 as a value designated by a user's operation, and has been stored in the user-specified power saving target memory module 532.

Here, the time period t for waiting the job processing in order to attain the power consumption reduction target value α is calculated by the following formula (6).

$$W_{cut-MAX} \cdot \alpha = (1 - e^{-\lambda t}) \cdot W_{cut-each} \cdot M \qquad (6)$$

$$\therefore W_{cut-each} \cdot M \cdot \alpha = (1 - e^{-\lambda t}) \cdot W_{cut-each} \cdot m$$

$$\therefore \alpha = (1 - e^{-\lambda t})$$

$$\therefore e^{-\lambda t} = 1 - \alpha$$

$$\therefore -\lambda t = \ln(1 - \alpha)$$

$$\therefore t = -\frac{1}{\lambda} \ln(1 - \alpha)$$

As mentioned above, the maximum job-keeping time t where the average number of issuance of jobs per unit time is λ and the power consumption reduction target value by a day is α can be expressed by t=−1/λ ln (1−α).

As described above, in this embodiment, since the information processing apparatus 400 accumulates the jobs in the queue to keep, and the printing apparatus 300 processes the jobs collectively, the number of times that the printing apparatus 300 shifts between the normal operation mode and the power saving mode can be reduced. Therefore, the power consumption of the printing apparatus 300 can be reduced.

This embodiment dynamically varies the threshold values of the maximum number of keeping jobs and the maximum job-keeping time that are used to determine whether the jobs should be processed collectively based on the operation history and the power consumption history of the printing apparatus 300. Accordingly, since the timings of which the print jobs are transmitted in series to the printing apparatus 300 can be appropriately determined based on the operation history or the power consumption history of the printing apparatus 300, the power consumption of the printing apparatus 300 can be reduced efficiently.

Next, an information processing system according to a second embodiment of the present invention will be described with reference to FIG. 14 through FIG. 16. It should be noted that descriptions about duplicated sections or corresponding sections with respect to the above-mentioned first embodiment will be omitted.

Figure 14:
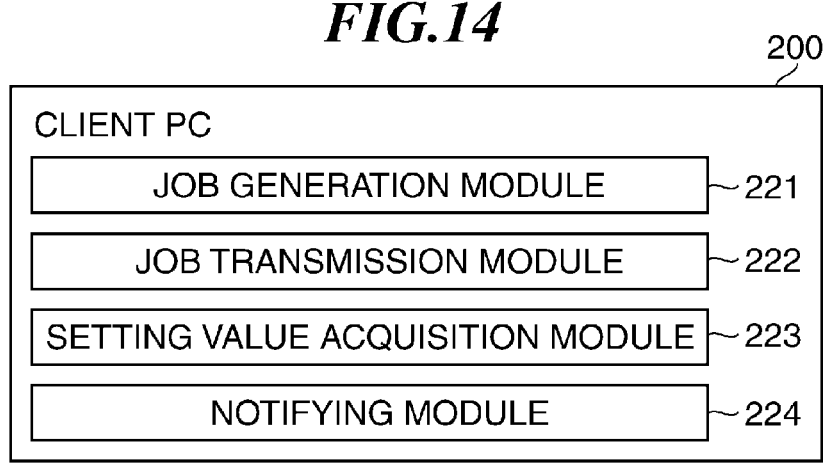
FIG. 14 is a block diagram schematically showing a module configuration example of software included in a client PC that constitutes an information processing system according to a second embodiment of the present invention.

FIG. 14 is a block diagram schematically showing a module configuration example of software included in the client PC 200 that constitutes the information processing system according to this embodiment.

As shown in FIG. 14, the client PC 200 is provided with a job generation module 221, a job transmission module 222, a preset value acquisition module 223, and a notifying module 224.

After the job generation module 221 generates a job, the client PC 200 acquires a set value of the maximum job-keeping time in the printing apparatus 300 from the information processing apparatus 400 by the preset value acquisition module 223. Then, after the notifying module 224 displays the set value of the maximum job-keeping time on the CRT 210 to notify a user of the setting, the job transmission module 222 transmits a job to the information processing apparatus 400.

Figure 15:
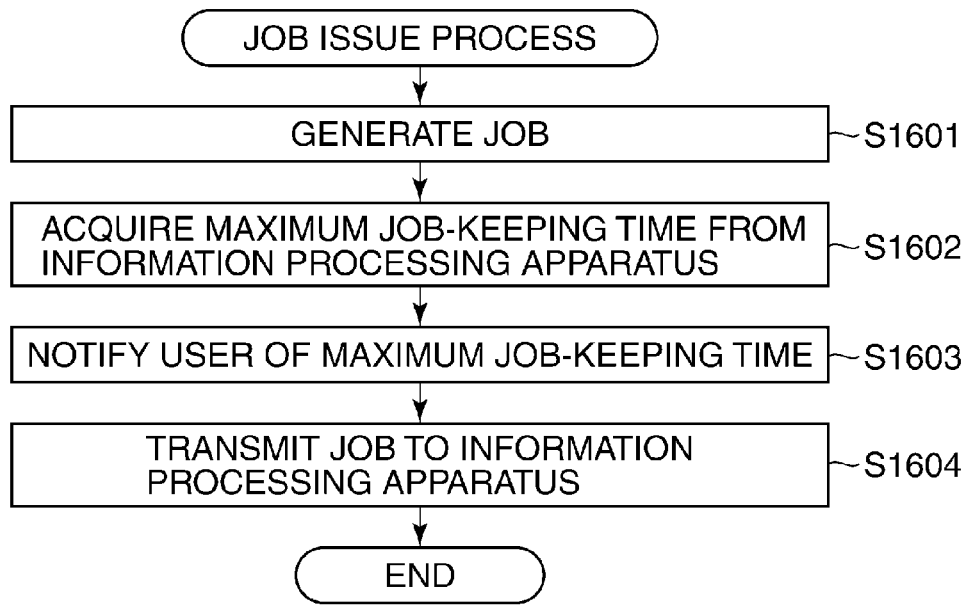
FIG. 15 is a flowchart showing a job issue process executed by a client PC in FIG. 14.
Figure 16:
FIG. 16 is a view showing a screen display example of the maximum job-keeping time notified in the step S1603 in FIG. 15.

FIG. 15 is a flowchart showing a job issue process executed by the client PC 200. Each process in FIG. 15 is achieved by loading a program stored in the ROM 203 or the external memory 211, like an HDD, of the client PC 200 onto the RAM 202 and by executing the program by the CPU 201 etc.

It should be noted that the CPU 201 of the client PC 200 will be described as a CPU 201C for convenience of description.

In FIG. 15, in step S1601, the CPU 201C generates a job by the job generation module 221 according to instructions by a user's operation etc., and proceeds with the process to step S1602.

In the step S1602, the CPU 201C acquires the maximum job-keeping time in the printing apparatus 300, which processes a job, from the information processing apparatus 400 by the preset value acquisition module 223, and proceeds with the process to step S1603.

In the step S1603, the CPU 201C displays the maximum job-keeping time acquired in the step S1602 on the CRT 210 to notify the user by the notifying module 224, and proceeds with the process to step S1604. An example of the screen display here is shown in FIG. 16.

In the step S1604, the CPU 201C transmits the job generated in the step S1601 to the information processing apparatus 400 by the job transmission module 222, and finishes the process.

As described above, in this embodiment, since the notifying module 224 notifies the user of the maximum job-keeping time in advance of transmitting a job, the user can grasp how soon the job is printed at the latest, which improves the user's convenience. The other configurations and operation effects are the same as that of the above-mentioned first embodiment.

It should be noted that the present invention is not limited to what has been described with the above-mentioned embodiments, and can be changed suitably unless it is deviated from the scope of the present invention.

For example, although the above-mentioned embodiments show the cases where the information processing apparatus 400 and the control apparatus 500 manage the printing apparatus 300, the information processing apparatus 400 may have the function of the control apparatus 500, or the information processing apparatus 400 may solely manage the printing apparatus 300.

Although the above-mentioned embodiments employ the maximum number of keeping jobs and the maximum job-keeping time as the threshold values that are changed dynamically based on the operation history and the power consumption history of the printing apparatus 300, it is not limited to this.

That is, when at least one of the maximum number of keeping jobs and the maximum job-keeping time is changed dynamically based on the operation history and the power consumption history of the printing apparatus 300, the power saving effect of the printing apparatus 300 is improved. Therefore, the threshold value of the maximum number of keeping jobs or the threshold value of the maximum job-keeping time may be changed solely and dynamically based on the operation history and the power consumption history of the printing apparatus 300.

Other Embodiments

Aspects of the present invention can also be realized by a computer of a system or apparatus (or devices, such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-094114, filed on Apr. 15, 2010, which is hereby incorporated by reference herein in its entirety.

What is claimed is:

1. An information processing apparatus capable of communicating with a printing apparatus via a network, comprising:
   a storage unit configured to store a power saving target value designated by user instruction;
   an accumulation unit configured to accumulate print jobs that should be transmitted to the printing apparatus;
   an acquisition unit configured to acquire a job processing history from the printing apparatus;
   a determination unit configured to determine a maximum number of keeping jobs, based on the power saving target value and the job processing history;
   a transmission unit configured to transmit the print jobs accumulated in said accumulation unit in series to the printing apparatus, in a case that a number of the accumulated print jobs has reached the maximum number of keeping jobs.

2. The information processing apparatus according to claim 1, further comprising a monitoring unit configured to monitor the printing apparatus to determine whether the printing apparatus is in a normal operation mode or in a power saving mode in which power consumption is lower than that in the normal operation mode,
   wherein, when the printing apparatus is in the normal operation mode, the transmission unit transmit the print jobs, even if the number of the accumulated print jobs has not reached the maximum number of keeping jobs.

3. The information processing apparatus according to claim 1, further comprising a calculation unit configured to calculate a power consumption that can be reduced by processing job in series for each job, based on the job processing history,
   wherein said determination unit determines the maximum number of keeping jobs, based on the power saving target value and the power consumption for each job.

4. An information processing method for an information processing apparatus capable of communicating with a printing apparatus via a network, the method comprising:
   a storage step of storing a power saving target value designated by user instruction;
   an accumulation step of accumulating print jobs that should be transmitted to the printing apparatus;
   an acquisition step of acquiring a job processing history from the printing apparatus;
   a determination step of determining a maximum number of keeping jobs, based on the power saving target value and the job processing history; and
   a transmission step of transmitting the print jobs accumulated in said accumulation step in series to the printing apparatus, in a case that number of the accumulated print jobs has reached the maximum number of keeping jobs.

5. An information processing apparatus capable of communicating with a printing apparatus via a network, comprising:
   a storage unit configured to store a power saving target value designated by user instruction;

an accumulation unit configured to accumulate print jobs that should be transmitted to the printing apparatus;

an acquisition unit configured to acquire a job processing history from the printing apparatus;

a determination unit configured to determine a maximum job keeping time, based on the power saving target value and the job processing history; and a transmission unit configured to transmit the print jobs accumulated in said accumulation unit in series to the printing apparatus, in a case that keeping time of the accumulated print jobs has reached the maximum job keeping time.

6. The information processing apparatus according to claim 5, further comprising a monitoring unit configured to monitor the printing apparatus to determine whether the printing apparatus is in a normal operation mode or in a power saving mode in which power consumption is lower than that in the normal operation mode, wherein, when the printing apparatus is in the normal operation mode, the transmission unit transmit the print jobs, even if the keeping time of the accumulated print jobs has not reached the maximum job keeping time.

7. The information processing apparatus according to claim 5, further comprising a calculation unit configured to calculate a job issuance probability that next job is issued during certain time period, based on the job processing history, wherein said determination unit determines the maximum job keeping time, based on the power saving target value and the job issuance probability.

8. An information processing method for an information processing apparatus capable of communicating with a printing apparatus via a network, the method comprising:

a storage step of storing a power saving target value designated by user instruction;

an accumulation step of accumulating print jobs that should be transmitted to the printing apparatus;

an acquisition step of acquiring a job processing history from the printing apparatus;

a determination step of determining a maximum job keeping time, based on the power saving target value and the job processing history; and a transmission step of transmitting the print jobs accumulated in said accumulation step in series to the printing apparatus, in a case that keeping time of the accumulated print jobs has reached the maximum job keeping time.

* * * * *